3,321,661
BRUSHLESS DIRECT CURRENT MOTOR
J. Roger Toth, Macedonia, Michael L. Gilliand, Kent, and Richard D. Sumser, Louisville, Ohio, assignors to Ametek, Inc., a corporation of Delaware
Filed May 12, 1966, Ser. No. 549,611
11 Claims. (Cl. 313—133)

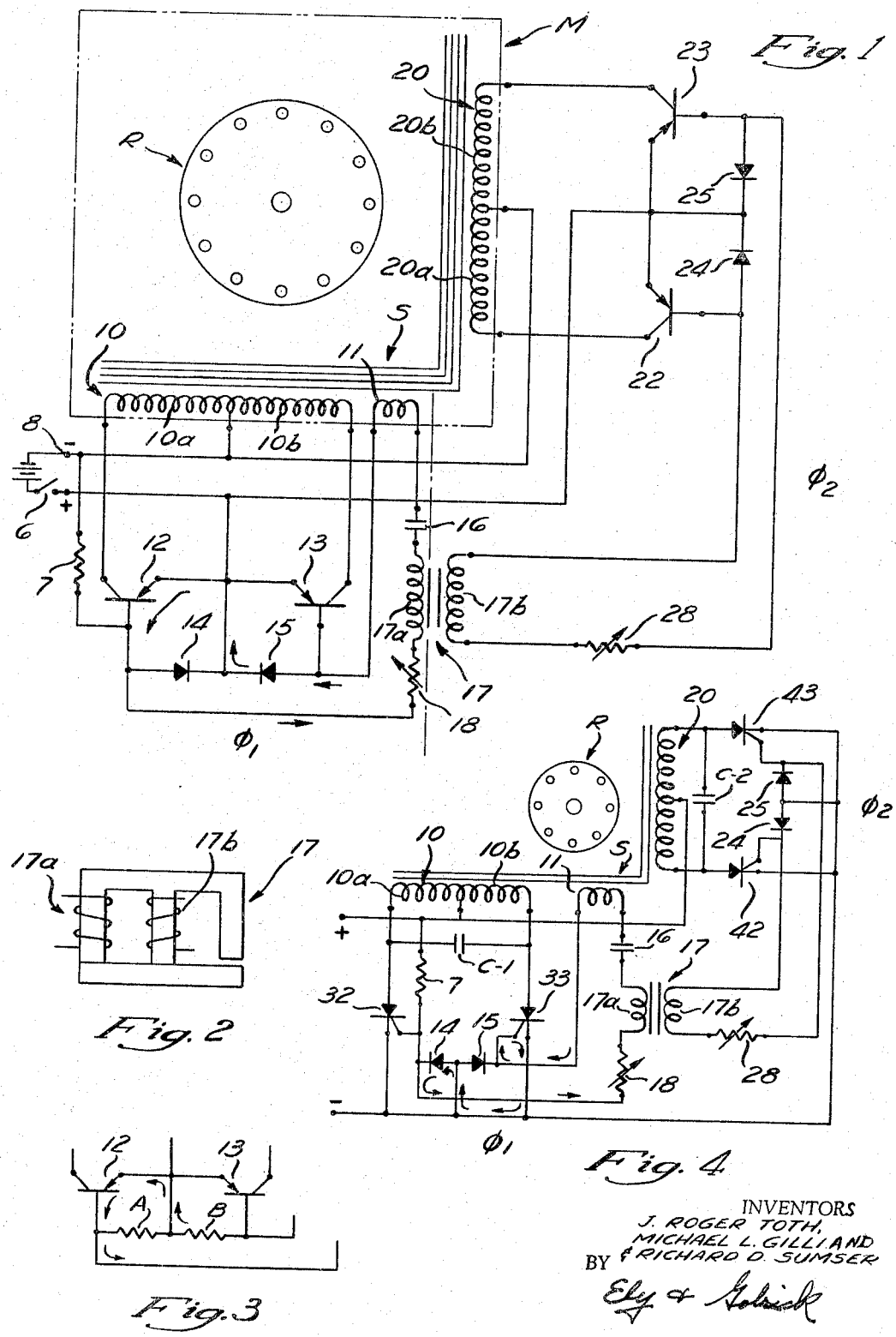

The present invention is concerned generally with so-called brushless direct current motors of the type wherein by suitable electronic switching devices direct current is applied to stator windings of the motor in such alternating manner that an alternating stator magnetic field is developed for driving a rotor of an induction motor or like alternating current motor type. More particularly the invention is concerned with providing novel "phase-lock" circuitry for polyphase wound motors of the type described whereby starting and running of the motor in an intended direction is assured.

In the embodiment of the invention hereinafter described, the motor and circuitry will be described as energized by a direct current primary power source; but it is to be understood that there could be included in the motor package suitable rectifier circuitry for direct current energization of the motor circuitry which is the subject matter of this invention, whereby the motor may be particularly adapted for operation from alternating current or become universal.

Several types of brushless direct current motors, as that terminology is used here, have appeared in the patented art and in commerce, having for example, an induction rotor squirrel cage type rotor, a main stator winding of a so-called divided type, a feedback winding on the stator, and electronic swtching devices controlled by pulses derived from the feedback winding for alternately energizing main stator windings from a D.C. source in such fashion as to develop an alternating stator magnetic field to drive the rotor in a manner similar to an induction motor.

In recent years for motors of this type there have come into use solid state devices such as silicon controlled rectifiers or power transistors, usually each switching device controlling a respective half of a main stator winding, the two halves of such a main winding, for example, being wound into the same stator slots but connected so that under operating conditions the magnetic flux produced by each is oppositely directed to that of the other. The circuitry then in such motors is in effect an oscillator or inverter type circuit. Various types of main winding arrangements have been used corresponding to prior alternating motor types, salient and non-salient poles, single-phase, two-phase etc. Accordingly the terminology applied to alternating current motors has been adopted with respect to the type of motors to which this invention pertains.

Where the motor is wound with a single-phase main winding, of course means to develop starting torque must be provided, usually including a further stator winding suitably angularly displaced from the main winding in series with a capacitor in order to effect a phase shift for starting purposes as long used in the alternating current motor art. On the other hand, motors of this type have also been provided with more than one main stator winding, for example, two windings as first and second phase windings each with an associated feedback winding and respective electronic switching devices for operation analogous to a polyphase motor without need of special starting windings.

However, for such two-phase wound motors with electronic switching devices, particularly transistors, it has been found necessary to provide some type of phase-lock circuitry to establish the sequence of operation of such devices, to ensure that the motor will always start and run in the desired intended direction.

Prior motors with phase-lock circuitry for many purposes have labored under certain disadvantages, in the number or character of stator windings required, requirements for special or costly components, or other untoward fabricational or operational aspects.

By the present invention it is proposed in a polyphase wound brushless D.C. motor of the character described to include in one phase circuitry a simple feedback winding with a choke or inductor, capacitor and, as needed, resistor forming a "semi-tuned" feedback circuit providing suitable switching controlling pulses for that phase, wherein the inductor is the primary of what we have here called a "choke-former" device, the secondary of which provides the pulses for the time control of the switching devices for the second phase.

This choke-former device is merely a high leakage transformer which, by the inductive coupling of the secondary with the primary as the inductor element in the first phase feedback circuitry, provides timing pulses shifted ninety degrees in phase from those effective in the first phase, so that with appropriate polarity connections of the feedback circuit to the switching devices of the first phase and then of the secondary to the solid state devices of the second phase to attain a desired direction of motor rotation there is insured a sequence of switching whereby the motor always operates in the same selected direction.

Thus the motor circuitry of this invention requires in addition to a main stator winding for each phase only a single feedback winding associated therewith on the stator, and this of a simple type. This is a decided advantage, for example, over a known two-phase wound motor of this type, wherein in addition to first and second phase main stator windings, there are further required two divided feedback windings, and for the phase-lock circuitry a third stator winding; for in effect there are eliminated two tapped stator windings, allowing a more compact stator design as well as eliminating the attendand cost in the stator production for inclusion of the two windings and in connecting the same in final motor assembly. Moreover, as the first stage feedback or driving circuitry is "semi-tuned," that is, is not and need not be highly tuned, the various components thereof may be more readily available and lower cost standard items. Further relatively simple overall circuitry is attained while yet permitting some range of adjustment in frequency of operation, therefore of speed selection for a given motor.

The general object of the present invention is then to provide a novel polyphase brushless motor circuitry wherein phase-lock is attained between the distinct phase circuits to ensure operation of the motor in one direction. Another object of the present invention is to provide, in a motor of the character described, circuitry affording suitable phase-locking but eliminating certain stator windings hitherto required in such a motor. A still further object is the provision of feedback and phase-lock circuitry for a motor of the charatcer described wherein less critical, more readily available, lower cost components may be used. A still further object is the provision of a motor of the character described wherein in addition to main stator windings required for each phase there is additionally required only a single further stator winding for feedback or switching control purposes. Other objects and advantages will appear from the following description and the drawings wherein:

FIG. 1 is a schematic representation of a two-phase wound brushless D.C. motor embodying the present invention;

FIG. 2 is a generalized representation of a "choke-former" device or component used in the circuitry of FIG. 1;

FIG. 3 is a partial schematic showing a minor modification; and

FIG. 4 is similar to FIG. 1 but with silicon controlled rectifiers.

In FIG. 1 of the drawings, presenting one embodiment of the invention, in a two-phase wound brushless direct current motor, the stator comprises a core wound in known manner with first and second phase main stator windings 10 and 20 respectively, and a third feedback winding 11 associated with the main first phase winding 10, which assembled with the rotor R and suitable frame and rotor shaft bearings, comprise the mechanical assembly of a motor M.

The circuitry $\phi_1$ comprises the two PNP transistors 12, 13 with emitter electrodes connected to the positive input terminal of the motor and collector electrodes respectively connected to the opposite ends of the first phase main stator winding 10, that is, to ends of its individual halves 10a, 10b, the other ends of which, at the center of the main winding symbol, being commonly connected to the negative input terminal 8. The opposite sides or output leads of the first phase driver or feedback circuit including winding 11 are connected respectively to the transistor bases as switching control electrodes and also by diodes 14, 15 respectively to the emitters, which in turn are connected to the positive power input terminal 9. Thus each main winding half with the collector and emitter pair of a respective common emitter connected transmistor form a collector-emitter circuit branch across the D.C. power input. Trigger means for one of the switching devices in the first phase circuit, for initial conduction, is afforded by a trigger branch, here represented by a resistor 7 connected from the negative lead 8 to the base of 12. In the second phase circuitry $\phi_2$ the two halves 20a, 20b of the main stator winding 20, the two PNP transistors 22, 23 and their respective diodes 24, 25 are similarly connected to each other, to the D.C. supply input terminals 8, 9 and to second phase feedback or driver circuit; the main windings 10, 20 spaced 90 electrical degrees on the core.

The feedback circuit in phase 1 is a semi-tuned, i.e., not sharply resonant, frequency-establishing circuit including feedback coil 11, which may be wound on the stator core in the same slots as the winding half portions 10a, 10b, with one coil end connected to the base of the transistor 13 and anode of 15, and other side to the base of the other transistor and the anode of 14 through the series branch comprised of a capacitor 16, a choke inductor 17a and an adjustable resistor 18, so that 11, 16, 17a and 18 by diode 15 are connected in the base-emitter circuit of 12 and by diode 14 in that of 13 respectively for successive opposite pulses in winding 11. The inductor 17a comprises the primary of a high leakage transformer 17 with general structure schematically represented in FIG. 2, the secondary 17b of which has one end connected to the base of transistor 22 and anode of 24 and its other end, through variable resistor 28 to the base of transistor 23 and anode of 25, to provide in conjunction with the diodes 24, 25 the feedback or driver circuitry for the second phase, with diodes 24, 25 again serving to connect 17b alternatingly in the base-emitter circuits of 23, 22 respectively as determined by the polarity of the feedback pulses.

When D.C. power is switched on or applied at the terminals 8 and 9 and thereby simultaneously applied across the four emitter-collector circuits of the transistors, transients occurring on initial power application, for example, by closing of a switch 6 will cause transistor 12 to go into an increasingly conductive state, by virtue of the connection of resistor 7 to the base of 12, causing an increasing current in the associated coil 10a, and magnetic flux change in the stator, which of course, induces feedback voltage in winding 11 and current in the phase 1 feedback circuit including 17a; and the phase 1 circuitry proceeds by usual inverter operation alternately to switch the transistors 12, 13, the period of conduction or operation of each transistor 12, 13, the oscillator frequency, then determined by the characteristics of the first phase inverter circuit, particularly the parameters of the feedback circuit, establishing the timing of the successive pulses of opposite polarity alternatingly to the bases of the transistors 12, 13. Thus a first phase alterating magnetic flux is established. However, as the initial effective first phase feedback pulse causes a pulse in 17b with substantially a ninety degree phase shift, which being applied to the base of one of transistors 22, 23 depending upon the polarity of the second phase feedback connections, say of 22, will cause that transistor to conduct substantially ninety degrees immediately after 12, thus beginning the oscillator inverter action in the second phase circuitry which will then proceed as in the first but shifted in phase substantially ninety degrees as required to develope motor starting torque. The direction of motor rotation is, of course, reversed merely by reversing the feedback lead connections to the bases in one phase.

The pulses in the primary phase feedback circuitry proceed at a frequency basically determined by the inductive, capacitive and resistive parameters of that circuit; determining not only the frequency of first phase oscillator operation, but also of the second phase having base drive obtained by the coupling in 17. The use of a high leakage transformer 17 for this purpose may be considered as to the first phase circuitry as equivalent to use of a choke as an inductor in the first phase feedback circuit in series with the primary of a perfect transformer as the coupling device to the second phase driver circuit.

By use of a variable resistor at 18 in a motor with given circuitry parameters, this frequency of oscillation and therefore motor speed can be varied within a certain range. The resistor 38 may be used as an auxiliary means for adjusting the relative parameters of the circuits for optimum operation.

Although the circuit arrangement with the diode pairs 14, 15 and 24, 25 as shown in FIG. 1 is preferable for providing suitable feedback and control pulse paths to the transistors, the arrangement indicated as by FIG. 3 could be used where such diodes are replaced by resistors A, B of suitable high values.

It should be noted that the invention is applicable also to a brushless motor of the character here described wherein other solid state electronic switching devices are used, such as silicon controlled rectifiers, rather than power transistors previously described, as in FIG. 4, a schematic diagram of the circuitry for a motor in which the pairs of SCRs 32-33 and 42-43 are used to control switching in the first and the second phase respectively with a commutating capacitor provided across the extreme ends of the stator windings 10, 20 for each phase, in other words connected between the anodes of the SCRs in each phase as shown in C-1, and C-2; certain other conventional generally used components however, being omitted for the sake of simplicity and clarity of the drawing, such as a protective diode and resistor branches connected between anode and cathode of each SCR.

In FIG. 4 components or elements identical or similar to those of FIG. 1 are indicated or designated by corresponding reference numerals except as where otherwise noted. Here a trigger circuit branch, again represented by a simple resistor 7 rather R-C series circuit branch, is connected from the positive power input lead to the gate of the SCR 32 to ensure that a specific one of the SCRs in the phase 1 circuitry will first conduct on initial power application. The leads from the feedback circuitry in phase 1 are connected to the respective gates of the first phase SCRs, and the diodes 14, 15 have their anodes commonly connected to the cathodes of the SCRs to which the negative power lead is connected, with their cathodes respectively connected to the SCR gates. A similar connection of the output leads from the secondary 17b and arrangement of diodes 24, 25 is used in the connections to the gates of the second phase SCRs 42, 43.

In this case upon application of power to the circuit, SCR 32 is turned on or goes into conduction switching current into the first phase main winding half 10a, the rising current as usual producing a changing magnetic field in the stator core, which in turn induces a voltage in the feedback coil 11 causing again a current flow which will substantially be 90° out of phase with the induced voltage. Such feedback current through 17a accordingly causes a pulse to arise in 17b which then will turn on one of the SCRs 42, 43, the specific one of these two depending upon the chosen polarity of the connection of the leads from 17b, thus establishing a phase-lock and direction of motor rotation. Thereafter the inverter operator of the circuit of the first phase will proceed in its usual known manner, SCRs 32–33 switching 180° out of phase with each other, 42–43 switching 180° out of phase with each other, but with the operation of the two phases established at a 90° out-of-phase relation, essentially so tied to the operation of the phase 1 circuitry by virtue of the derivation of the gating pulses for the second phase from the feedback coil 11 in the manner and with the phase shift described.

This application of the invention is useful even with currently available SCRs as generally used in circuitry of this type, but is even more advantageous with a new and improved form of SCR which has now been developed having a very short turn-on time in which moreover conduction initiates over substantially the entire area of the controlled junction rather than locally about and propogating from a particular point or a plurality of points of connection of gate electrodes as in prior SCRs.

In FIGS. 1, 3 and 4 the like diodes 14, 15, or like resistors A, B in the first phase circuitry (and similar arrangements in the second phase circuitry) afford in effect by-pass paths around each solid state switching device for control signals applied to the other device of the same phase, so that a complete feedback path is provided alternately including each device of a given phase in the feedback circuit with the alternating feedback pulses. Thus the forward resistance of diode 15 is low compared to the base to emitter resistance of transistor 13 as the feedback pulse for control of transistor 12 arises, the reverse resistance of diode 14 of course, being higher than the emitter to collector resistance of transistor 12, and conversely when the feedback polarity is reversed and applied to 13. In FIG. 4, a similar relation of the forward and reverse diode resistances to the cathode-gate and gate-cathode resistance of the SCRs is present; the reverse resistance of a diode being higher than the gate-cathode resistance of the associated SCR, and its forward resistance lower than the cathode-gate resistance. In FIG. 3 the identical value of resistors A, B is chosen at a high value between the emitter-collector and collector-emitter resistances of the transistor.

We claim:

1. A brushless direct current motor comprising an induction motor type rotor; a stator having a divided first phase main winding; a divided second phase main winding like to the first but spaced ninety electrical degrees on the stator core from the first; each said main winding divided in equal halves; a feedback winding associated on the core with the first phase main winding; a pair of solid state switching devices for each main winding, each said device having two electrodes connected in series with a respective half of the corresponding main winding across a direct current source and having a third electrode as a control electrode serving with a first of said two electrodes for application of switching control pluses to the device, said first electrodes of each pair of devices commonly connected, whereby upon alternating switching action of the devices associated with each main winding an alternating magnetic flux is produced in the stator core by the corresponding main winding; a first phase driver circuit including said feedback winding connected in series with a capacitor and inductor, said driver circuit having output leads, each output lead connected to a control electrode of a respective one of the first phase switching devices, and respective means affording a shunt between each lead about one of said devices for completing a feedback path for pulses of appropriate polarity controlling the other of said first phase switching devices, whereby alternate feedback pluses of opposite polarity are effective to cut-off and turn on one of said switching devices while turning on and cutting off the other in an inverter action at an operating frequency determined substantially by the parameters of the feedback circuit; a second phase driver circuit including an inductor, with output leads each connected to the control electrodes of the respective second phase switching devices and including respective shunt means as in the first phase driver circuit; said inductors of the first and second phase feedback circuits provided by the primary and secondary respectively of a transformer, whereby pluses in the first phase feedback winding produce driver pulses in the first and second phase driver circuits sufficiently out of phase to result in a starting torque-developing alternating magnetic field in said stator core.

2. A motor as described in claim 1 wherein a variable resistor is included in said first phase feedback circuit whereby the frequency of switching operation for the first phase main winding and thereby for the second phase is adjustable to adjust the motor speed.

3. A motor as described in claim 1 wherein said switching devices are transistors with the bases thereof serving as said control electrodes.

4. A motor as described in claim 3, wherein a common emitter connection circuit configuration is used for each transistor.

5. A motor as described in claim 4, wherein said transistors are PNP type power transistors with each said means a diode connected with cathode and anode to the emitter and base respectively of a corresponding transistor.

6. A motor as described in claim 3 wherein said transformer is a high leakage type device.

7. A motor as described in claim 4 wherein each said means is a resistor connected between emitter and base of a respective transistor.

8. A motor as described in claim 1 having silicon controlled rectifiers as said devices with each main winding having a communtating capacitor in parallel therewith across the anodes of a respective pair of said rectifiers, the output leads of the driver circuits to the gates of the rectifiers as said control electrodes.

9. A motor as described in claim 8 with each said means a diode with its anode and cathode connected to cathode and gate of a respective said rectifier.

10. A motor as described in claim 9 wherein each driver circuit includes a series variable resistor whereby the frequency of operation of the first phase circuitry and thereby motor speed is adjustable within a limited range and the second phase driver circuit accommodated thereto.

11. A motor as described in claim 8 wherein said transformer is a high leakage type device.

No references cited.

ORIS L. RADER, *Primary Examiner.*

G. SIMMONS, *Assistant Examiner.*